(No Model.) 6 Sheets—Sheet 1.
M. O. GODDING.
COMBINED AUTOMATIC THRASHER, FEEDER, AND SEPARATOR.
No. 489,301. Patented Jan. 3, 1893.

WITNESSES:
Fred G. Dieterich
M. D. Blondel

INVENTOR:
Milton O. Godding.
BY Munn & Co
ATTORNEYS

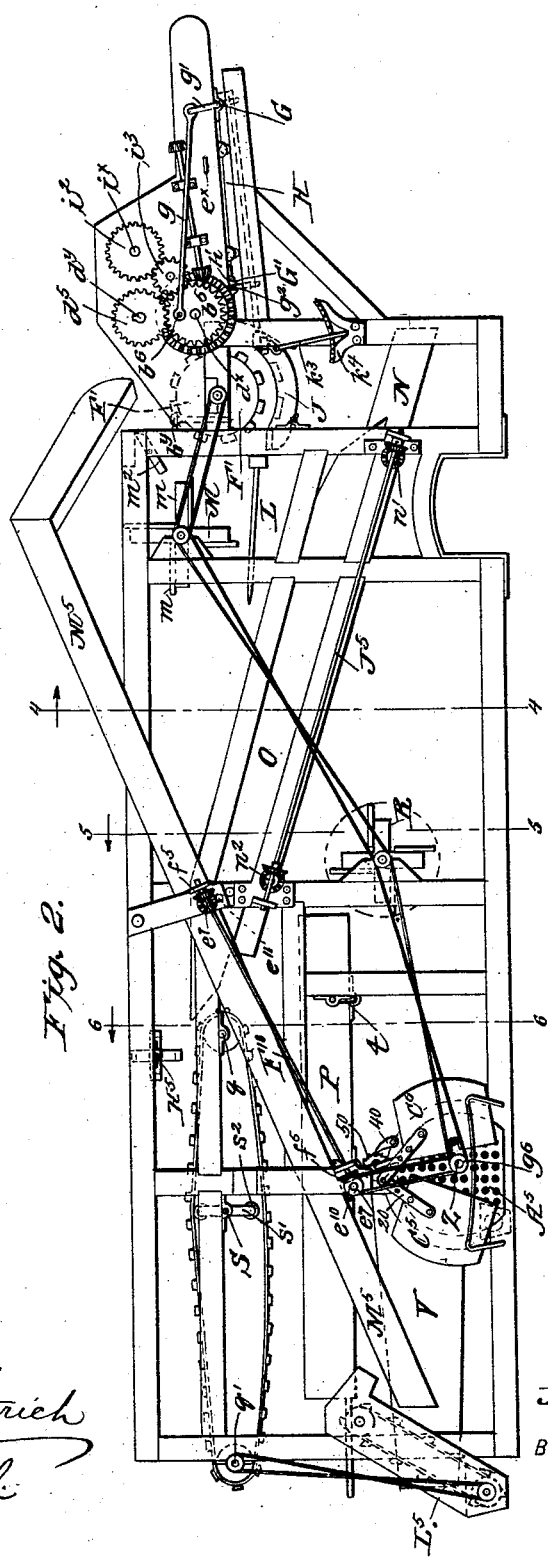

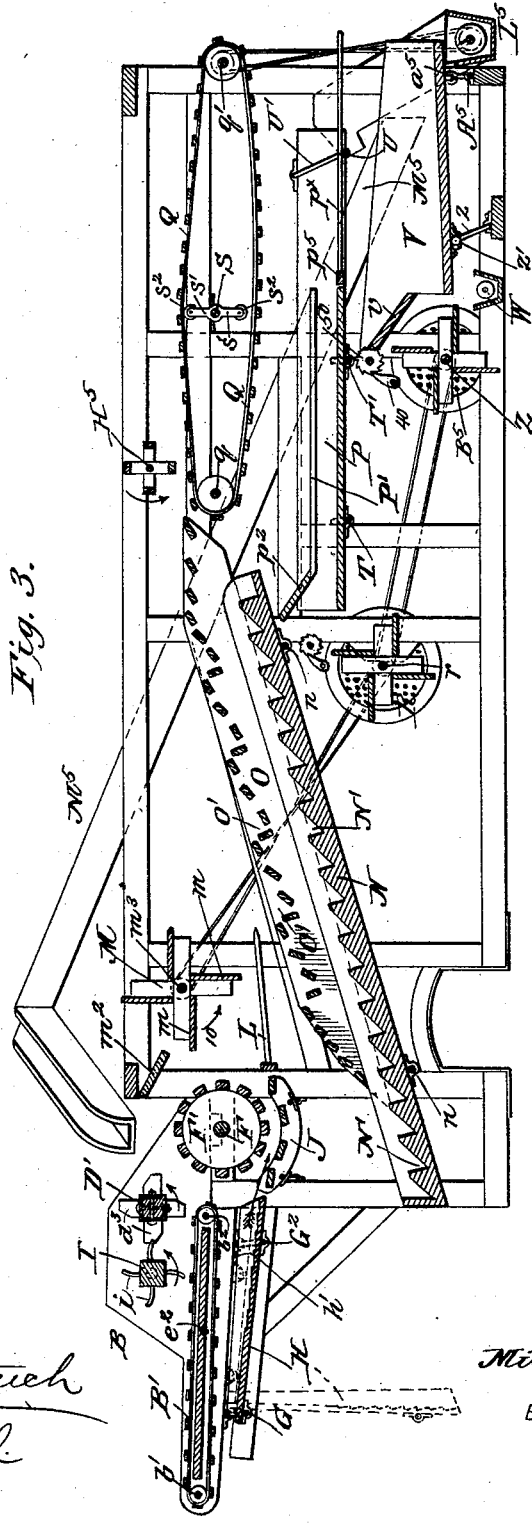

(No Model.)  6 Sheets—Sheet 4.
M. O. GODDING.
COMBINED AUTOMATIC THRASHER, FEEDER, AND SEPARATOR.
No. 489,301.  Patented Jan. 3, 1893.
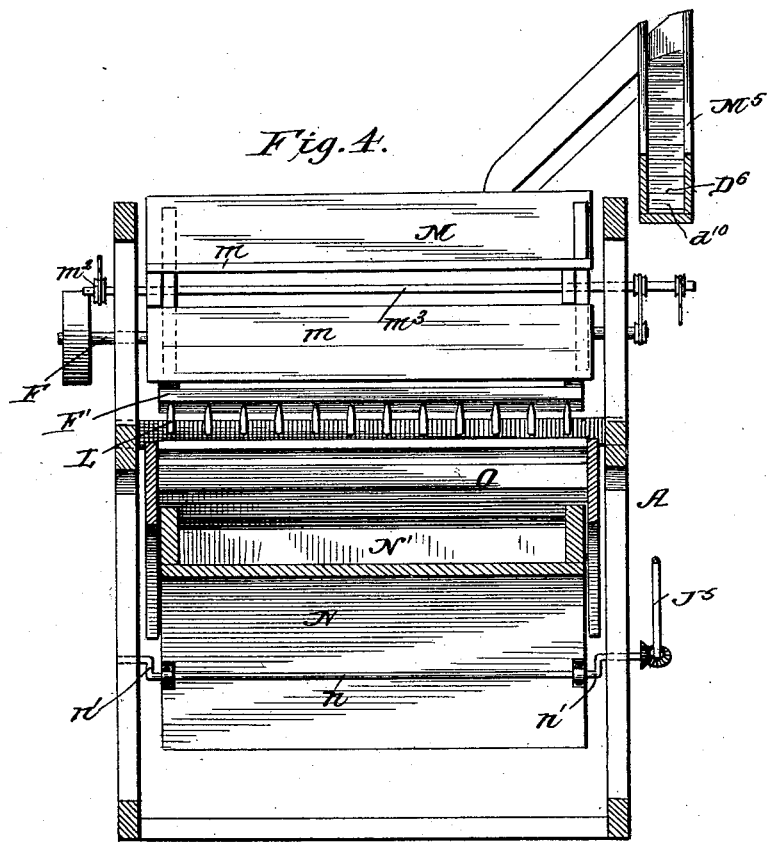
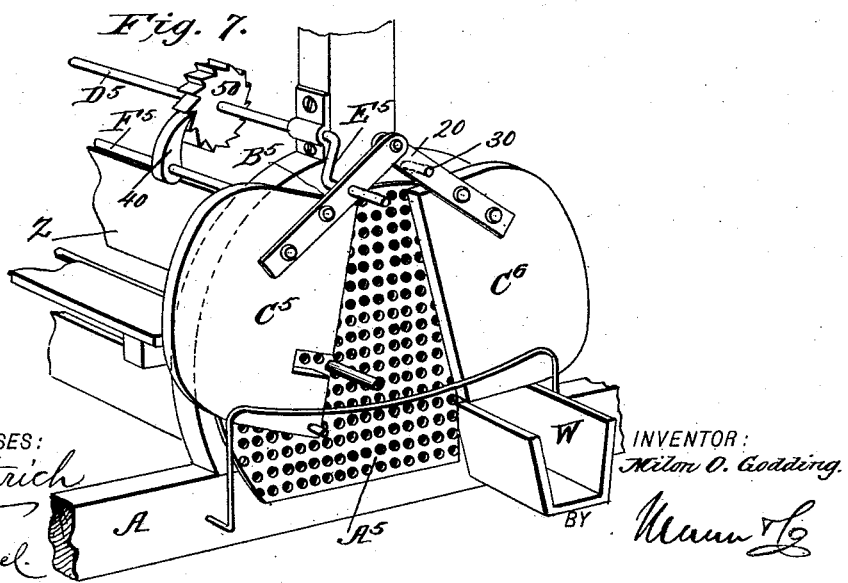

(No Model.) 6 Sheets—Sheet 5.
M. O. GODDING.
COMBINED AUTOMATIC THRASHER, FEEDER, AND SEPARATOR.
No. 489,301. Patented Jan. 3, 1893.

WITNESSES:
Fred G. Dieterich
M. D. Blondel

INVENTOR:
Milon O. Godding
BY
ATTORNEYS (No Model.) 6 Sheets—Sheet 6.
M. O. GODDING.
COMBINED AUTOMATIC THRASHER, FEEDER, AND SEPARATOR.
No. 489,301. Patented Jan. 3, 1893.
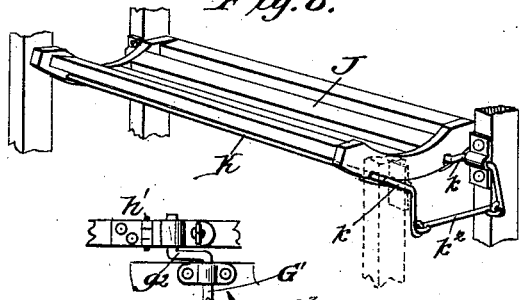
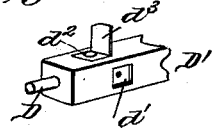
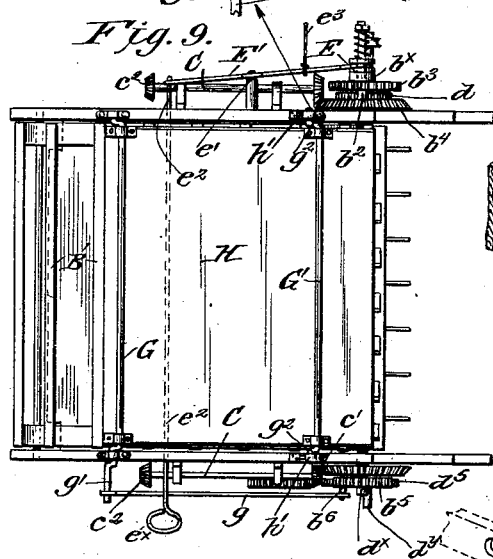
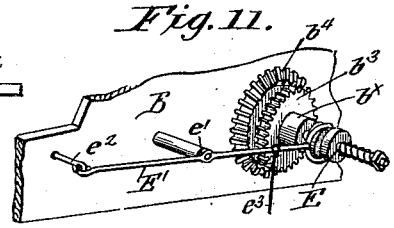
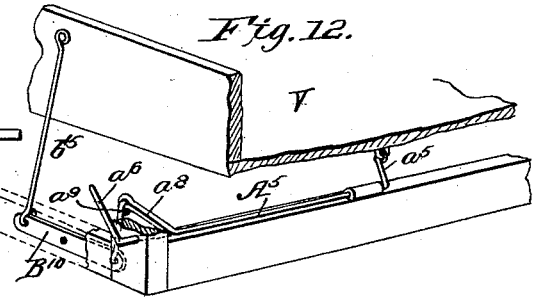
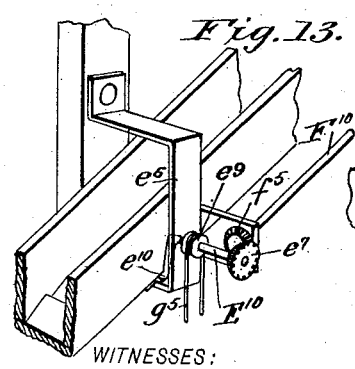
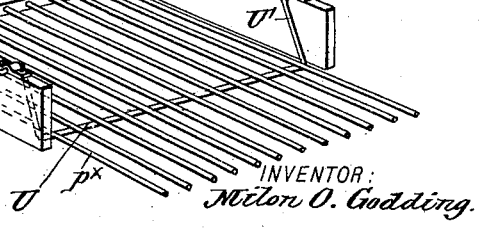
WITNESSES:
Fred G. Dieterich
M. D. Blondel
INVENTOR:
Milon O. Godding.
BY
ATTORNEYS

UNITED STATES PATENT OFFICE.

MILON O. GODDING, OF MONROVIA, CALIFORNIA.

COMBINED AUTOMATIC THRASHER, FEEDER, AND SEPARATOR.

SPECIFICATION forming part of Letters Patent No. 489,301, dated January 3, 1893.

Application filed March 11, 1892. Serial No. 424,602. (No model.)

*To all whom it may concern:*

Be it known that I, MILON O. GODDING, residing at Monrovia, in the county of Los Angeles and State of California, have invented a certain new and useful Combined Automatic Thrasher, Feeder, and Separator, of which the following is a specification.

My invention relates to combined feeding, thrashing and separating machines and it has for its object to provide a machine of this character in which the several parts automatically operate to feed, thrash and separate the grain, in a quick, continuous and effective manner.

Figure 1:
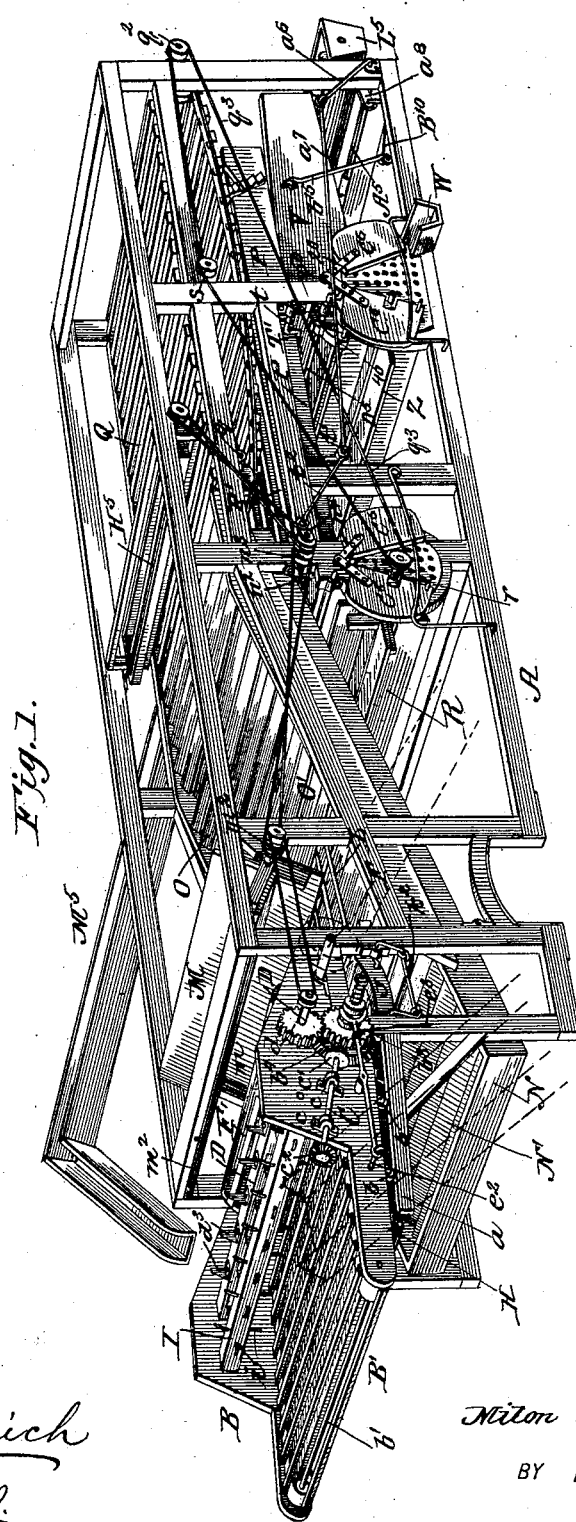
Figure 5:
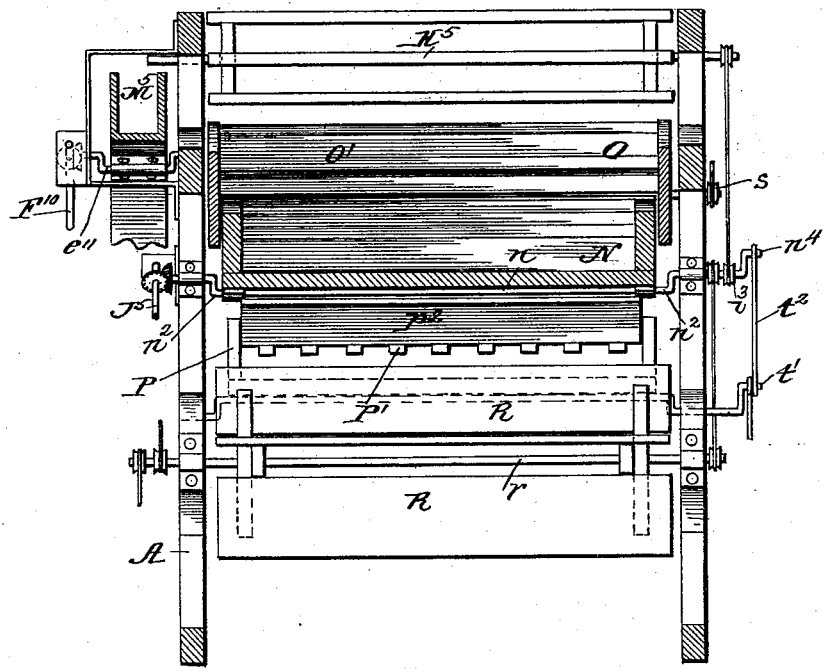
Figure 6:
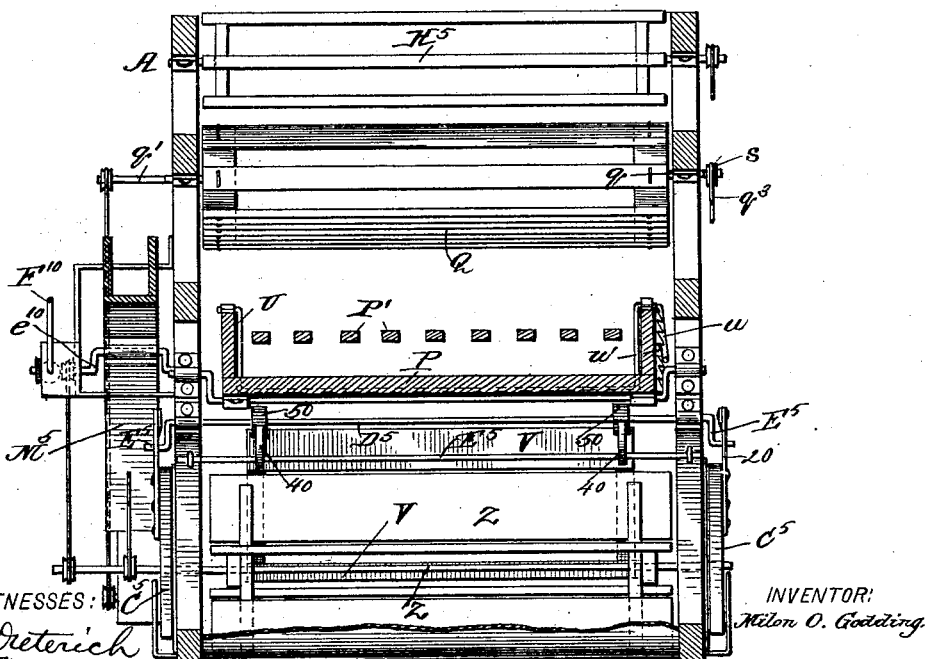

With other minor objects in view all of which will hereinafter be apparent my invention consists in the peculiar combination and novel arrangement of parts all of which will hereinafter be fully described in the specification and particularly pointed out in the claims, reference being had to the accompanying drawings in which Figure 1 is a perspective view of my improvement. Fig. 2 is a side elevation thereof. Fig. 3 is a central vertical longitudinal section of my improved machine. Fig. 4 is a vertical cross section of the same taken on the line 4—4 Fig. 2—looking in the direction indicated by the arrow. Fig. 5 is a similar view taken on the line 5—5 Fig. 2. Fig. 6 is a detail cross section on the line 6—6 Fig. 2. Fig. 7 is a detail perspective view of the blast controlling devices hereinafter referred to. Fig. 8 is a detail view illustrating the concave operating mechanism. Fig. 9 is a bottom plan view of the feeder. Fig. 10 is a detail view of one of the cutter blades, and a portion of the bandcutter shaft. Fig. 11 illustrates the friction clutch operating devices. Fig. 12 is a detail view of the lower grain shoe vibrating mechanism. Fig. 13 is a detail view illustrating the elevator vibrating devices. Fig. 14 is a detail view of the adjustable frame hereinafter more specifically referred to.

For the sake of clearness, I shall describe my invention beginning at the feed end of the machine, following as near as possible the course of the grain, therethrough, set forth the construction and operation of the several parts in detail, which successively feed thrash and separate the grain.

Referring to the accompanying drawings, A indicates the main frame which in general construction is substantially as shown in Fig. 1, its front end having forwardly extending members $a$ which form guide rail supports for the feeder frame, B, which has guide rollers $b\ b$ whereby it can be readily slid onto the rails $a$ and it being held to the main frame by a suitable lock pin device $b^y$ as shown.

Within the frame B is the slatted feed carrier B' mounted on the shafts $b'\ b^2$ the inner one $b^2$ of which extends beyond the sides of the frame and carries a loose cog $b^3$ and bevel gear wheels $b^4$, with which mesh bevel pinions $c'$ on shafts C journaled in bearings $c$—$c$ on the sides of the frame B, which have bevel gears $c^2$ at the outer ends with either of which, meshes the drive gear of the upper shaft, of the feed elevator, which elevator may be of any ordinary construction. The loose cog $b^3$ is geared with and driven by the shifting cog gear $d$ held on the band cutter shaft D to turn therewith, which shaft is belted with the main drive shaft F, in a manner clearly shown in the drawings.

To provide a simple and effective means whereby the operation of the elevator and feeder carrier can be instantly stopped when such elevator or carrier becomes clogged or for any other desired purpose, a spring actuated slide clutch E is mounted on the shaft $b^2$ to turn therewith which is normally held in frictional contact with the friction clutch collar $b^x$ on the gear $b^3$.

E' indicates the clutch operating lever which is pivoted at $e'$ its front end being connected to a rod $e^2$ which extends across the feeder frame and is projected and formed with a suitable hand hold $e^x$, a cord or rod $e^3$ being also connected to the lever near its clutch engaging end as shown. By this construction it will be noticed that should the elevator be connected with the frame B on the clutch side the attendant by pulling upon the cord or rod $e^3$ can quickly disengage the clutch members and stop the operation of the elevator and carrier; when, however, the feed elevator is connected to the opposite end of the frame B the attendant can disengage the clutch member by pulling on the rod $e^2$.

The end $d^x$ of the shaft $b^2$ carries a fixed cog wheel $b^5$ provided with a wrist pin $b^6$, to which is connected one end of a pitman rod $g$ the outer end of which is connected with the crank arm $g'$ of a crank hanger G, which is secured to the under side of a rocker trough or chute H at its outer end, the inner end thereof being supported on a similar crank hanger G' the crank arms $g^2$ of which are journaled in hinged bearings $h'$ (see Fig. 9) for a purpose presently explained. This chute H has its bottom serrated and inclined downward, as shown in Fig. 3, and such chute effectually serves to retard any rearward movement of the grain, the reciprocating motion imparted thereto from the shaft $b^2$ serving to shake off and feed the grain held therein onto the concave presently referred to. By supporting this chute upon the hangers G G', and journaling the crank end of the shaft G' in hinged bearings as stated, the inner end of the chute can be readily swung down by disengaging the ends $g^2$ from the bearings $h'$ and any refuse or clogging matter can be quickly removed therefrom.

D. indicates the band cutter shaft formed with the square enlargement or hub D' which is cast or otherwise formed with a series of sockets $d'$, in which seat the base portions $d^2$ of the cutter blades $d^3$ such base portions being held secure in the sockets by bolts and nuts as shown.

As it is necessary that the feed carrier B' be revolved at a slower speed when thrashing wet grain the end $d^y$ of the shaft D is formed with a shifting gear $d^5$, which when the gears $d$ and $b^3$ are in mesh, is disengaged from the gear $b^5$ but when it is desired to run the carrier at a slower speed the gear $d^5$ is shifted into engagement with the gear $b^5$ and the gear $d$ thereon out of mesh with the wheel $b^3$, the relative diameters of the several gears being such as to produce the varied speed stated.

I indicates a picker cylinder journaled in the frame B on the feed side of the band cutter, it having a series of picker fingers $i$ which when the cylinder is revolved, pass in close proximity to the carrier apron B', the shaft of such cylinder being extended as at $i^x$ and provided with a gear $i^2$ which meshes with an idler $i^3$, which in turn meshes with a cog gear $b^5$.

As seen in Fig. 3, the fingers and the cutters $d^3$ intermesh and as the cutters and fingers move in the same directions the cutters will not only serve to cut the bands and part the grain bundles, but will also serve to clean the fingers $i$ as they pass up between the cutters. It will be noticed, that as the carrier apron B' and fingers $i$ travel inward together the straw bundles will be the more uniformly fed to the band cutters, and also assist in distributing the straw as the bands are cut, and as it passes under the cutters to be discharged onto the concave.

The cylinder F' is of the usual construction and is mounted on the main drive shaft F journaled in the front end of the main frame A as shown, and below which is mounted the concave J, which is held for vertical adjustment upon the crank hangers $k$ of rock shafts K, which are linked together as at $k^2$ (see Fig. 8), one of such shafts having a downwardly extending adjusting arm, $k^3$ which engages a rack member $k^4$. By this construction I am enabled to adjust the concave vertically with relation to the cylinder.

As the grain is carried forward by the cylinder F' it is discharged onto a series of inwardly extending fingers L where it is engaged by the beater arms $m$, of the main beater M and such arms moving in the direction indicated by the arrow 10 will serve to draw the grain forward as they beat it and at the same time prevent it being thrown up, an adjustable guard board $m^2$ projected diagonally from the top of the frame also serves to prevent any upward discharge of the grain. Such of the grain as is separated from the straw at the concave drops down into the lower end of the main grain elevator shoe N, and such as is separated at the beater falls into the lower end of the straw elevator shoe O, and passes therethrough into the shoe N. The construction and arrangement of these shoes will be most clearly understood by reference to Fig. 2 of the drawings in which it will be noticed that they are connected together, the lower one N, extends down under the concave to the front end of the machine, and is inclined upward and has its discharge end disposed over the intermediate vibrating shoe P presently referred to, such shoes N and O being supported on the crank portions $n$ $n$ of crank shafts $n'$ $n^2$, the upper one $n^2$ of which has a belt pulley $n^3$, which is belted with a pulley $m^2$, on the beater shaft $m^3$, which in turn is belted with the cutter shaft as shown. The bottom of the shoe N is formed of a series of transverse angular step-like pockets, N' while the bottom of the shoe O is formed of a series of slatted step-like portions O' whereby pockets are formed, such pockets being however, of much greater length than the grain pockets in the shoe N. It will thus be seen that the grain as it is separated from the straw and falls through the slatted bottom of the shoe O into the shoe N, and the straw as it is drawn over the fingers L falls onto the slatted floor O'. By supporting the shoes upon the crank shafts $n$ $n'$ as shown, a circular shaking motion is obtained as the shafts $n$ $n'$ are revolved, imparting thereby a thorough agitating motion to the straw and grain. By imparting a circular shaking movement to the shoes, a more effectual shaking and separation of the grain are obtained than by simply rocking the shoe as is ordinarily the case. This is explained as follows: When the shoe has simply a rocking motion the grain is always in contact with the bottom thereof, but in a circular motion the shoe as it drops and rises beyond its horizontal bearing axis serves to jump the grain up and down, giving it a series of successive sudden jars causing thereby a more thorough separation. As the grain is agitated as stated it is constantly caused to climb the pockets of the shoe and is finally discharged into the intermediate shoe P: the straw is likewise carried up the shoe O, and discharged onto a straw carrier, which consists of an endless slatted apron Q, mounted upon shafts $q$ $q'$, the outer one $q'$ of which has a drive pulley $q^2$ belted with the drive shaft of the main fan R which in turn is belted with the beater drive shaft $m^3$ (see Fig. 3). The belt $q^3$ which connects the pulley $q^2$ with the fan shaft $r$ has a frictional connection with and drives a pulley $s$ on a transverse shaft S, mounted on the main frame and disposed below the upper straw carrier section, it being provided with transverse knocker arms $s'$ $s'$ in the ends of which are friction pulleys $s^2$ $s^2$, which alternately engage the straw carrier belts, and constantly agitate the same.

The main fan R is journaled centrally of the machine at a point just to the rear of the receiving end of the intermediate shoe, such end being at a point under the discharge end of the shoe N.

Referring now to Fig. 3 it will be seen that the shoe P has a finger partition P' the rear end of which is formed with an upwardly inclined deflector board P² which serves to lead the heads tailings &c. onto the fingers P' and also to lead the blast from the fan R over the bottom of the shoe and up through the fingers P', whereby the chaff &c., is blown off as the grain heads &c. are dropped into the shoe. This shoe is also hung to have a circular longitudinal motion whereby to thoroughly agitate the grain, it being supported on the crank portions $t$ of the shafts T T', one of which T is projected and formed with a crank member $t'$ which is connected through the pitman $t^2$ with a crank member $n^4$ on the shaft $n^2$ as shown in Fig. 1. The fingers P' extend entirely over the solid rear portion of the shoe P and the forward bottom portion of such shoe consists of a screening frame formed of a series of arms or rods $p^x$ projected from a transverse bar $p^5$ pivoted at the discharge end of the solid base of the shoe P as shown, the front end of such fingers being supported on the crank loop U of a rock shaft U', one end of which has a lever arm $u$ held to engage a rack $u'$ on the side of the shoe.

The object of supporting the front end of the fingers in the manner stated is to render such frame adjustable, the outer end being slightly elevated when dry grain is being worked to slightly retard the movement of the tailings, heads &c., which are blown forward by the fan R, such frame being however, lowered to a horizontal position when wet grain is being worked.

V indicates a vibrating shoe which has its under end extended under the shoe P to a point under the solid discharge end, such shoe V having at its inner end an inclined chute or board $v$ on which the grain falls as it leaves the shoe P. This shoe V, has its bottom inclined downward its inner end being open to discharge into a conveyer W of any suitable construction, which discharges the grain to one side of the machine as shown, and such discharge end is in front of the fan Z as clearly shown in Fig. 3.

To provide simple and effective means for regulating the blast into the lower shoe and also to prevent the forcing of dust and dirt therein, the devices most clearly shown in Figs. 3 and 7 are used which consist of screen plates A⁵ secured over the air receiving ends B⁵ of the fan, over which are held to operate adjustable gate sections C⁵ C⁶ which can be spread or closed in, to increase or decrease the suction draft of the fan. To maintain an even blast the gate sections C⁵ C⁶ are arranged to be operated simultaneously; to this end a shaft D⁵ is journaled transversely of the frame the ends of which have crank members E⁵ on which are hung the supporting arms of the sections C⁵, the ends of which are extended and pivotally connected with the upper ends of the arms 20 of the sections C⁶ which arms are pivoted on the frame as at 30. The crank members E⁵ of the shafts D⁵ are extended and formed into handle portions by means of which all of the gate sections can be simultaneously opened or closed from either side of the machine.

By providing the screening plates for the ends of the fan, the dirt and dust particles are effectually prevented from being drawn in by the suction blast of the fan. The fan R is similarly provided with screening and blast adjusting devices as clearly shown in the drawings.

To hold the gates to their adjusted position a second shaft F⁵ is journaled parallel with the shaft D⁵ which shaft F⁵ carries pawls 40—which engage ratchet wheels 50 in the shafts D⁵ as clearly shown in Fig. 7.

To provide for a substantially universal vibratory movement to the shoe V, it is supported at its inner end on a rocker arm $z$, by means of a ball joint connection $z'$ while its front end is similarly connected to the crank $a^5$ of a rock shaft A⁵ the end of which is formed into a long crank arm $a^6$ to which is connected one end of a pitman arm $a^7$ the other end of which is connected with and operated by the crank member $t'$. By this construction it will be seen that as the pitman $a^7$ is operated a rocking motion will be imparted to the shaft A⁵ and a longitudinal arc motion to the shoe V.

By reference to Fig. 12 it will be noticed that the shaft A⁵ has a crank member $a^8$ projected therefrom, which is connected by the link $a^9$ with one end of a rocker plate B¹⁰ the opposite end of which is connected by a rod $b^{15}$ with one side of the shoe V. By this arrangement when the shaft A⁵ is rocked, the plate B¹⁰ is also rocked, and a lateral rocking motion thereby imparted to the shoe V at the same time it is moved longitudinally. By supporting the shoe V in the manner stated, it will be seen that as the shaft $A^5$ is rocked the shoe will be moved longitudinally, vertically and laterally thereby imparting a most thorough and constant agitation of the grain. Such of the heads, tailings &c. which are worked over the outer end of the shoe V fall into a conveyer $L^5$ which leads them into the lower end of the elevator $M^5$, the upper end of which extends up and discharges in front of the cylinder. This elevator is mounted upon the crank portions $e^{10}$ $e^{10}$ of shafts $E^{10}$ journaled in the side bearings $e^6$ (see Fig. 13) which shafts have beveled gears $e^7$ which mesh with similar gears $f^5$ on a longitudinal shaft $F^{10}$ motion being imparted to such shafts by the belt $g^5$ which connects the pulley $e^9$ in the lower shaft $E^{10}$ with a pulley $g^6$ on the shaft of the fan Z. By supporting the elevator in the manner stated it will be noticed a circular motion will be imparted thereto, causing the heads &c. to be constantly jumped or thrown, thereby causing them to drop successively into the various pockets $D^6$ (formed of transverse ridges $d^{10}$) and be thereby carried up to the discharge end of the elevator. By connecting the rocker shaft $E^{10}$ by the geared shaft $F^{10}$ in the manner shown a uniform motion will be imparted to the shafts $E^{10}$, and for this purpose it should be stated that the shafts $n'$ $n^2$ of the main elevator shoe are similarly connected by a longitudinal shaft $J^5$ geared to such shafts $n'$ $n^2$ in a manner clearly shown in Fig. 3.

From the foregoing description taken in connection with the drawings, the advantages and complete operation of my invention will be readily understood.

The grain as it is elevated to the feed carrier is fed to the concave, under the beater, onto the arms L, and dumped onto the inclined straw carrier shoe O, such of the grain as is separated dropping onto the shoe N, and owing to the peculiar circular motion imparted to such shoes N and O the grain is constantly jumped up from one pocket to the other in the shoe N, and the straw being similarly treated is further agitated as it is elevated to the carrier where it is carried forward to the discharge end or to stacker, it being further beat in its course by a small open beater $H^5$, and the carrier being constantly agitated by the knocker arms $s'$ $s'$ causes a still further and final separation of the grain from the straw. Such of the separated grain tailings, heads &c. as are elevated by the shoe N are discharged onto the fingers $P'$ and subjected to the first blast, the chaff and dust &c. being blown out as before stated. The separated material after being thoroughly shaken in the shoe P is carried over the adjustable fingers, dropped into the shoe V and subjected to its final blast, such of the heads or tailings as pass over the outer end of the shoe V being conveyed to the elevator, which carries them back to the concave to receive a second treatment.

Having thus described my invention what I claim and desire to secure by Letters Patent is

1. The combination with the main frame, of a feeder frame detachably held on the front end thereof, the endless apron $B'$. journaled in such feeder frame, the band cutter $D'$ journaled transversely over the delivery end of the apron, the picker cylinder I, arranged transversely over the carrier in advance of the band cutter, and drive mechanism connecting the band cutter, picker cylinder and endless carrier, and arranged to drive such carrier band cutter and picker cylinder to feed the material in the same direction, substantially as shown and described.

2. The combination with the main frame, the cylinder and concave, said frame having forwardly extending guide arms or rails $a$ $a$ of the feeder frame adapted to be slid onto such arms and means for holding it to its operative position, the endless carrier mounted in said frame, the cutter shaft, carrying the cutters $d$, the picker cylinder journaled in front of and parallel to the cutter shaft, having fingers arranged to intermesh the cutters and means for operating the carrier forward and the cutter and picker cylinders in the same directions substantially as and for the purpose described.

3. The combination with the main frame the concave, the frame section B, and the endless carrier mounted therein, of the chute H the crank shaft $g$ connected to the frame B and forming a pivotal support for the outer end of the chute H the crank shaft $G'$ pivotally mounted on the inner end of said chute H, and the hinged bearings $h'$, on the frame B, adapted to receive the crank ends $g^2$ of such shaft $G'$ substantially as and for the purpose described.

4. The combination with the feeder frame B the endless carrier having its shaft $b^2$ extended as at $d^x$, a cog wheel $b^5$ fixedly held thereon at one end and a loose friction gear $b^3$ at its opposite end, of the band cutter D, having its shaft extended at its ends, and carrying at one end a gear $d$ engaging the loose gear $b^3$, and at its opposite end a shifting gear $d^5$ adapted to be moved into engagement with the gear $b^5$, the shifting clutch E on the shaft $b^2$ and means for imparting motion to the band cutter shaft substantially as and for the purpose described.

5. In a thrashing and separating machine essentially as described, the combination with the main frame, the elevating shoe N and the vibratory shoe V, of the intermediate shoe P, having a solid rear portion a supplemental slotted portion disposed above such solid portion having a solid upwardly inclined board $p^2$ at its rear end, and a pivoted finger portion at its front end and means for adjusting the outer end of such finger portions to different elevations substantially as and for the purpose described.

6. In a machine of the kind described the combination of the vibratory shoe V, and the shoe P having a solid rear bottom portion and open front portion extended over the shoe V, of the screen frame consisting of the transverse bar, $p'$ hinged at the end of the solid base of the shoe P, provided with forwardly projecting fingers P, the rock shaft U journaled in the shoe and supporting the free end of the fingers P' and means for holding the shaft U to its adjusted positions, substantially as shown and for the purpose described.

7. The combination with the main frame and the separating and thrashing devices of the rock shaft $A^5$ having a crank arm $a^5$, the rocker arm $z$, the shoe V having a ball joint connection with rocker arm $z$, said shaft $A^5$ having a crank arm $a^6$ and a crank member $a^8$ the rocker plate $B^{10}$ pivoted in the frame, the rod $b^5$ connecting one end of plate $B^{10}$ with the side of the shoe V, the link connection $a^9$, between the plate $B^{10}$ and the arm $a^8$ and means for rocking the shaft $A^5$, all arranged substantially as shown and for the purpose described.

8. The combination with the fan supporting frame, the fan Z, the gate sections $C^5$ $C^6$ independently pivoted but joined together, the shaft $D^5$, having crank members $E^5$ forming the pivotal bearing for the sections $C^5$, said shaft $D^5$ having ratchets 50 the rock shaft $F^5$ provided with pawls 40 adapted to engage the ratchet 50 all arranged substantially as and for the purpose described.

9. The combination with the conveyer $L^5$ and the cylinder $F'$ of the side bearings $e^6$, the crank shafts $E^{10}$ $E^{10}$ journaled therein said shafts having beveled gears $e^7$, the shaft $F^{10}$ having beveled gear connections with the gears $e^7$ and the elevator chute $M^5$ having a series of transverse pockets $m^5$, said chute mounted on the crank shafts $E^{10}$ all arranged as shown and for the purpose described.

MILON O. GODDING.

Witnesses:
    FRED G. DIETRICH,
    SOLON C. KEMON.